C. G. WESTLUND.
FRICTION CLUTCH.
APPLICATION FILED MAR. 6, 1914.
1,171,994.
Patented Feb. 15, 1916.
2 SHEETS—SHEET 1.
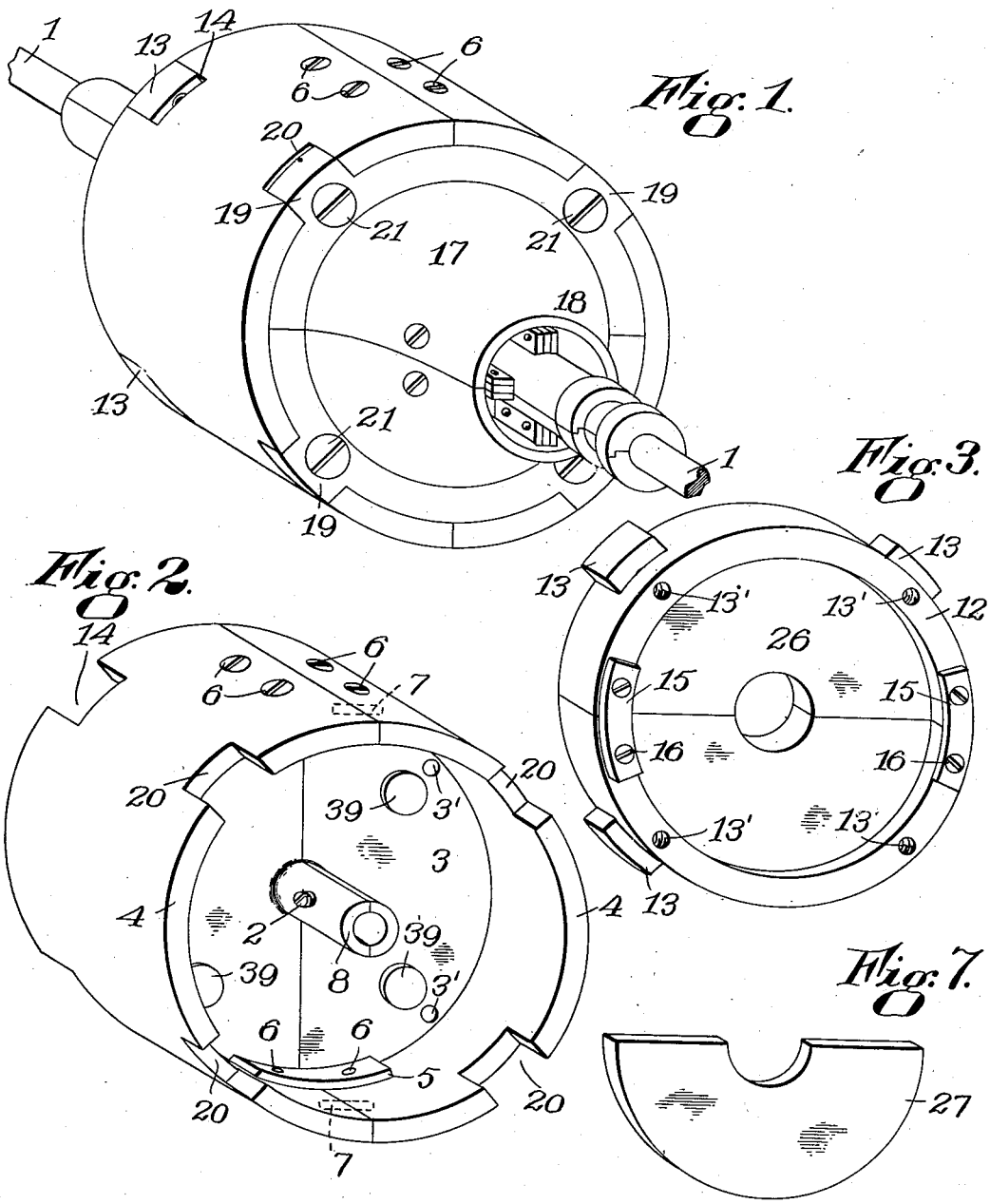

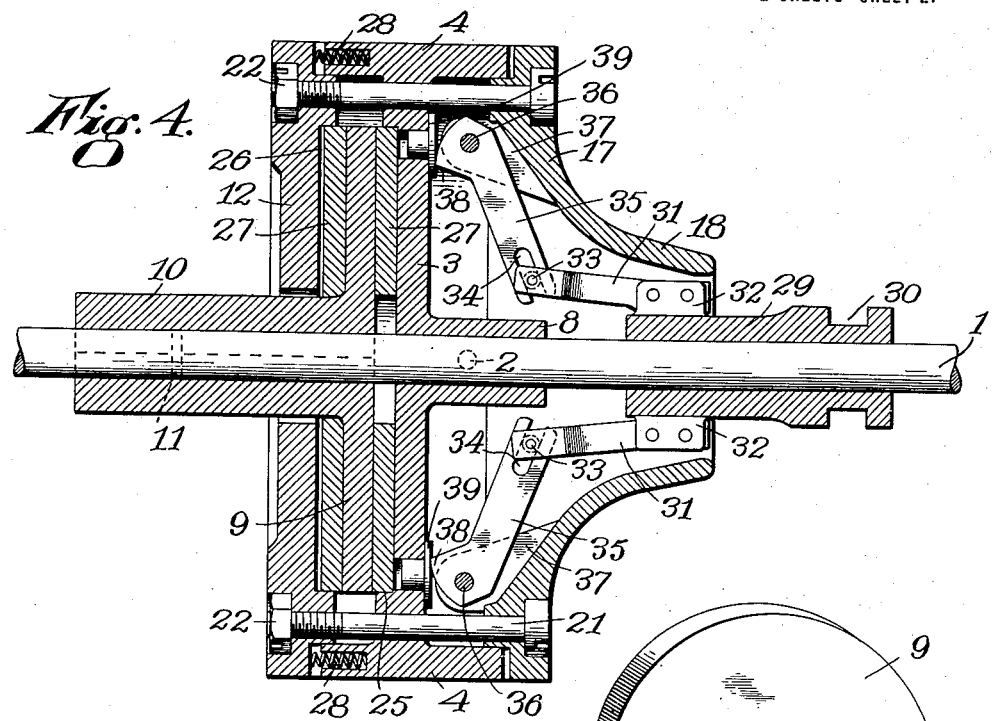
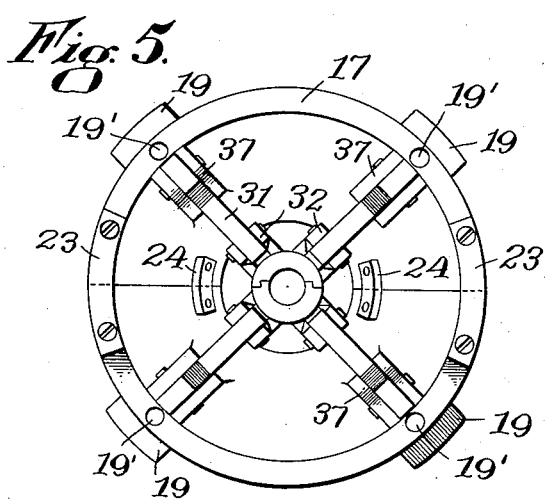
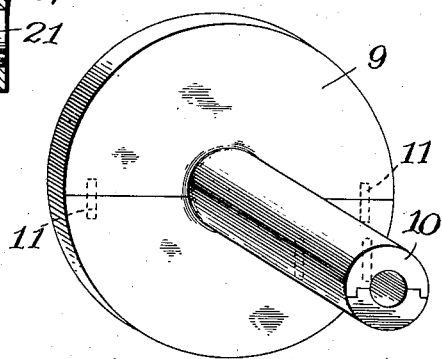

UNITED STATES PATENT OFFICE.

CARL G. WESTLUND, OF WORCESTER, MASSACHUSETTS, ASSIGNOR TO CARL G. WESTLUND COMPANY, OF WORCESTER, MASSACHUSETTS.

FRICTION-CLUTCH.

1,171,994.  Specification of Letters Patent. Patented Feb. 15, 1916.

Application filed March 6, 1914. Serial No. 822,799.

*To all whom it may concern:*

Be it known that I, CARL G. WESTLUND, a citizen of the United States, residing at Worcester, in the county of Worcester and Commonwealth of Massachusetts, have invented a new and useful Improvement in Friction-Clutches, of which the following description, taken in connection with the accompanying drawings, is a specification.

An object of my invention is to provide a friction clutch of simple and inexpensive construction.

A further object consists in the provision of a clutch which can be readily applied to shafting in ordinary use, without tearing down, rearranging, or disturbing in any way said shafting or the mechanism to which it is desired to apply the clutch.

Other and further objects will be apparent from the following description and the claims annexed thereto.

Referring to the accompanying drawings, Figure 1 is a perspective view of a clutch embodying my invention. Fig. 2 is a perspective view of a flanged wheel forming part of the clutch and which is adapted to be secured to the shaft which is to be driven through the clutch. Fig. 3 is a perspective view of closure plate or ring adapted to be secured to the wheel shown in Fig. 2. Fig. 4 is a central longitudinal section of the clutch mechanism assembled on a shaft. Fig. 5 is an interior view of a second closure plate which carries a portion of the mechanism. Fig. 6 is a perspective view of a driving wheel adapted to receive a driving pulley on its hub. Fig. 7 is a perspective view of one section of a divided friction disk.

Like reference characters designate like parts in the several figures.

The shaft 1, on which the clutch mechanism is assembled, is the "driven" shaft, adapted to be connected with the source of power, not shown, through the medium of the clutch, as hereinafter set forth. To this end, the shaft has secured thereto, by means of a set screw 2, a wheel 3, which is made in halves as shown in Fig. 2, for convenience in assembling the same on the shaft. Each half of the wheel 3 has integral therewith a rim portion 4, the halves being secured together on shaft 1 by interior overlapping straps 5 attached to each rim portion by screws 6. The abutting edges of the rim portions are furthermore provided with holes to receive dowel pins 7, whereby the halves of the wheel are securely united. The set screw 2 passes through an integral hub 8 of the wheel, which is likewise of divided construction, corresponding to the wheel.

Loosely mounted on shaft 1, and positioned within the rim 4 of wheel 3, is a wheel 9, having an elongated hub 10, said wheel and hub being made in halves as shown in Fig. 6, and the said halves being secured together on shaft 1 by dowel pins 11, 11. A driving pulley, not shown, is adapted to be splined to the hub 10 of wheel 9 in order to impart rotation from the source of power to said wheel.

An annular plate 12, capable of sliding movement within the flange 4 of the wheel 3, has its central aperture of greater diameter than hub 10, to permit free rotation of the latter, as shown in Fig. 4. The periphery of plate 12 is provided with four equidistant radial ears 13 which are slidable within correspondingly shaped and spaced notches 14 in the edge of flange 4 for a purpose to be hereinafter described. The member 12 is likewise made in halves, as shown in Fig. 3, to facilitate mounting on the shaft, the line of division being at right angles to the line of division between the halves of wheel 3, in order to secure an interlocking of the parts, as hereinafter more fully set forth. The halves of member 12 are secured together by interior overlapping straps 15, having screws 16 entering each half. On the opposite side of wheel 3, a substantially annular member 17, having a hub-like longitudinal extension 18, is carried within the rim 4 in the same manner in which the member 12 is carried. To this end the periphery of member 17 is provided with four equidistant radial ears 19, which are slidable within notches 20 in the edge of the rim, the said notches being longitudinally alined with the previously described notches 14 in the other edge of the rim. Alined apertures 13', 19' and 3' are provided in plate 12, member 17 and wheel 3 respectively, preferably adjacent the spaced ears 13 and 19 of said plate 12 and member 17. The apertures 13' are screw threaded to receive the screw threaded ends of screw bolts 21 passing through all of said alined apertures, and held by nuts 22 on their outer ends. The member 17 is made in halves, which are joined by peripherally disposed straps 23, 23 and inner straps 24, 24, Fig. 5, each of said straps overlapping each half and being secured thereto by screws. The line of division between the halves is parallel to the line between the halves of plate 12.

The opposing faces of wheel 3 and annular member 12 are recessed at 25 and 26 respectively to receive the friction disks 27, preferably of wood, and made in halves, as shown in Fig. 7. Said disks lie on either side of the driving wheel 9, and when the clutch is not operative, permit the free rotation of the wheel 9 between them, owing to the fact that the plate 12 is maintained at the limit of its movement, to the left in Fig. 4, by springs 28, carried in holes extending inward from each notch 14, and pressing outwardly against the corresponding ears 13 of said member 12. The actuation of the clutch, by the mechanism about to be described, moves plate 12 inward against the action of said springs, compressing the two disks 27 and the wheel 9 between the opposing faces of plate 12 and wheel 3, whereby the rotation of the wheel 9 is frictionally imparted to the shaft 1 through wheel 3 and its interlocked member 12. The shaft 1 has slidably mounted thereon a shipper sleeve 29, provided with a groove 30 at its outer end for the attachment of a shipper lever, not shown, to effect longitudinal movement of the sleeve. At its other end the sleeve 29 carries four equidistant, upwardly and inwardly inclined arms 31, which lie in radial planes coincident with each of the four bolts 21, and each of which is rigidly attached by a pair of rivets to upstanding ears 32 on said sleeve. The arms 31 are forked at their ends and have journaled therein rollers 33 of hardened steel which are adapted for rolling contact against the sides of elongated slots 34 in the ends of levers 35. Each lever 35 is pivoted at 36, between ears 37 on the inner face of the member 17, and has a cam surface 38 formed thereon, which is designed for rolling contact against a contiguous disk 39 of chilled or tempered steel in the face of the wheel 3, whereby to force the member 17 in the opposite direction to the movement of the sleeve 29 when the latter is moved inwardly of the clutch. This outward movement of the member 17 causes the connected member 12 to move in the same direction against the action of the springs 28, thereby causing frictional engagement of the disks 27 with opposite sides of the wheel 9, and with the opposing recessed faces of the wheel 3 and plate 12, whereby the rotation of the wheel 9 is imparted to the shaft. The reverse movement of the shipper sleeve moves the cam surfaces 38 away from the disks 39, permitting springs 28 to move the plate 12 to the left in Fig. 4, thereby disengaging the friction disks 27 from the wheel 9. It is to be noted that the friction disks 27 and the shipper sleeve 29 are made sectional in the same manner as the other elements of the clutch, whereby the whole device may be assembled on any line of shafting without necessitating the tearing down of the same.

It will be noted that while each member of the clutch which surrounds the shaft is of sectional construction, the structural strength of the whole is not thereby impaired, owing to the fact that the members 3 and 12, and the members 3 and 17, which are in interlocking engagement, are divided respectively in transverse planes. By reason of this arrangement, each line of division of one member is spanned by an integral section of another member, the latter interlocking with the two sections of the former.

It will be further noted that the construction by which the arms 31 are held rigid with respect to sleeve 29, and moved longitudinally of the shaft, maintains in all positions of said arms an obtuse angle between each of them and the levers 35, whereby buckling of the parts is prevented. The rolling contact of the rollers 33 with the sides of the slots 34 eliminates the possibility of the lost motion between the parts, which would result from wear if the members 31 were pivoted at each end.

I claim,

1. In a friction clutch, the combination with a driven shaft, of a driving wheel loosely journaled thereon and capable of longitudinal movement, a driven wheel fixed to said shaft and having a rim surrounding said driving wheel, said driven wheel and its rim being diametrically divided, annular inclosing members disposed on opposite sides of said driven wheel, each providing lugs in slidable interlocking engagement with the rim of said driven wheel, said members being diametrically divided at an angle to the line of division of said driven wheel and rim, annular divided friction devices interposed on each side of said driving wheel, and means for moving one of said annular inclosing members toward said driving wheel to press said friction devices into engagement with the opposing surfaces of the driving and driven parts.

2. In a friction clutch, the combination with a driven shaft, of a divided driving wheel loosely journaled thereon and capable of longitudinal movement, a driven wheel fixed to said shaft, and providing a rim, said driven wheel and rim being diametrically divided to permit of assembly on said shaft, friction devices disposed on opposite sides of said driving wheel, one of said devices being between said driving wheel and said driven wheel, an annular member disposed on the opposite side of said other friction device, said annular member having slidable interlocking engagement with the rim of said driven wheel and being diametrically divided at an angle to the line of division of said driven wheel, and means for moving said annular member longitudinally of the shaft, to press the friction devices into engagement with the faces of said driving wheel.

CARL G. WESTLUND.

Witnesses:
PENELOPE COMBERBACH,
NELLIE WHALEN.